United States Patent [19]

Baldy

[11] Patent Number: 5,712,886
[45] Date of Patent: Jan. 27, 1998

[54] DEVICE FOR DETECTING AND MONITORING PERFORATION OF THE BOTTOM HEAD OF THE VESSEL OF A NUCLEAR REACTOR

[75] Inventor: Jean Baldy, Rueil Malmaison, France

[73] Assignee: Atea, Societe Atlantique de Techniques Avancées, Carquefou, France

[21] Appl. No.: 708,268

[22] Filed: Sep. 6, 1996

[30] Foreign Application Priority Data

Sep. 11, 1995 [FR] France ................... 95 10623

[51] Int. Cl.[6] .............. G21C 17/00; G21C 9/016; H01L 35/02
[52] U.S. Cl. ............ 376/247; 376/249; 376/280; 136/202; 136/223; 136/224; 136/225; 136/228; 136/230; 374/179
[58] Field of Search ................. 376/245, 247, 376/249, 280; 374/179, 208; 136/200, 202, 213, 216, 223, 224, 225, 227, 228, 230, 242

[56] References Cited

U.S. PATENT DOCUMENTS

| | | | |
|---|---|---|---|
| 2,279,043 | 4/1942 | Harrington | 136/224 |
| 4,162,175 | 7/1979 | Salt et al. | 136/233 |
| 4,385,197 | 5/1983 | Schwagerman | 136/221 |
| 4,553,432 | 11/1985 | Barlian et al. | 73/336 |
| 4,764,336 | 8/1988 | Aubert et al. | 376/272 |
| 5,192,132 | 3/1993 | Pelensky | 374/136 |
| 5,347,556 | 9/1994 | McDonald et al. | 376/280 |

FOREIGN PATENT DOCUMENTS

| | | | |
|---|---|---|---|
| 204212 | 12/1986 | European Pat. Off. | 376/247 |
| 0 278 102 | 8/1988 | European Pat. Off. | |
| 875803 | 8/1979 | France . | |
| 2625357 | 12/1977 | Germany | 376/280 |
| 59-112290 | 6/1984 | Japan | 376/245 |

OTHER PUBLICATIONS

Barbet et al, "A New Advanced Fixed In-core Instrumentation for a PWR Reactor", *Nuclear Instruments and Methods*, Jan. 1981, pp. 377–386.

*Primary Examiner*—Kathryn L. Gorgos
*Assistant Examiner*—Chrisman D. Carroll
*Attorney, Agent, or Firm*—Pollock, Vande Sande & Priddy

[57] ABSTRACT

The detection device includes at least one thermocouple (10) arranged aligned with the bottom head of the vessel of the nuclear reactor, having a first branch (9) made of a first metallic material and at least one second branch (11) made of a second metallic material, different from the first material, welded to a point on the first branch constituting a hot junction of the thermocouple (10). The first branch (9) of the thermocouple has the form of an elongate hollow section. The device furthermore includes means for analyzing the measurements taken by the thermocouples (10).

15 Claims, 5 Drawing Sheets

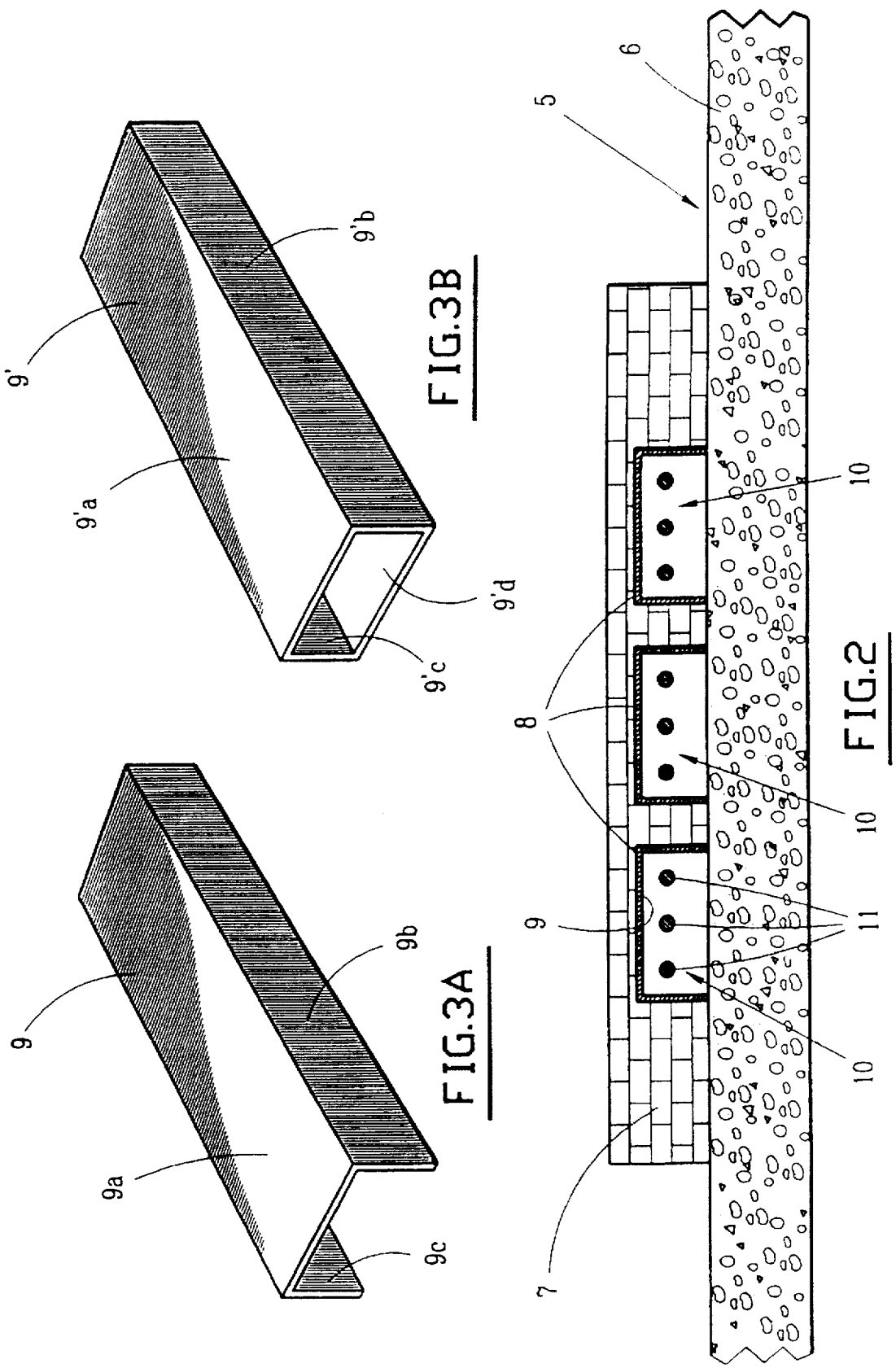

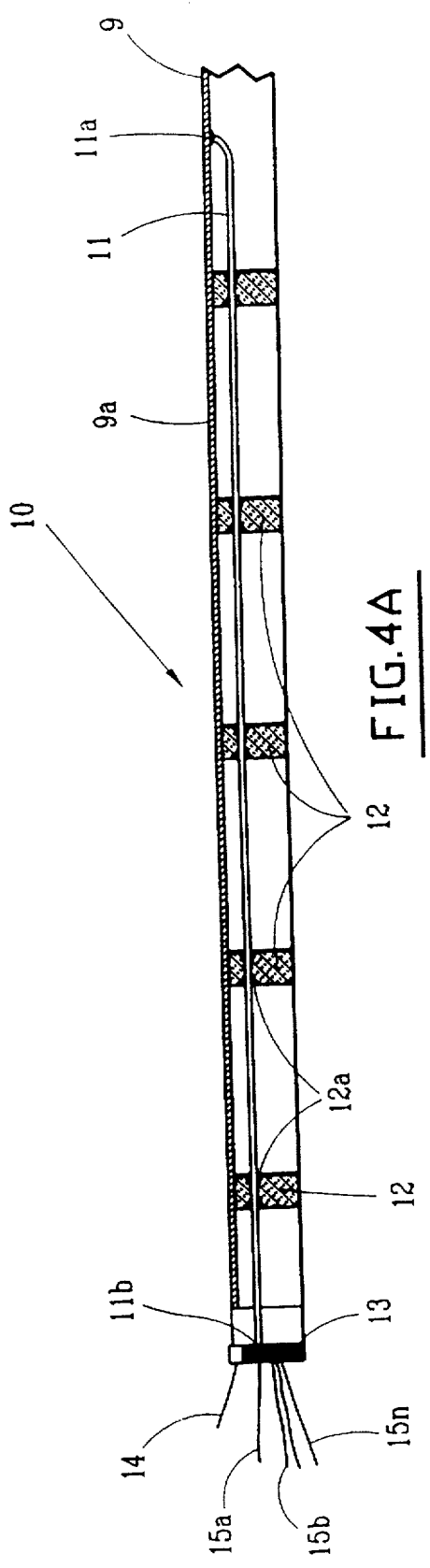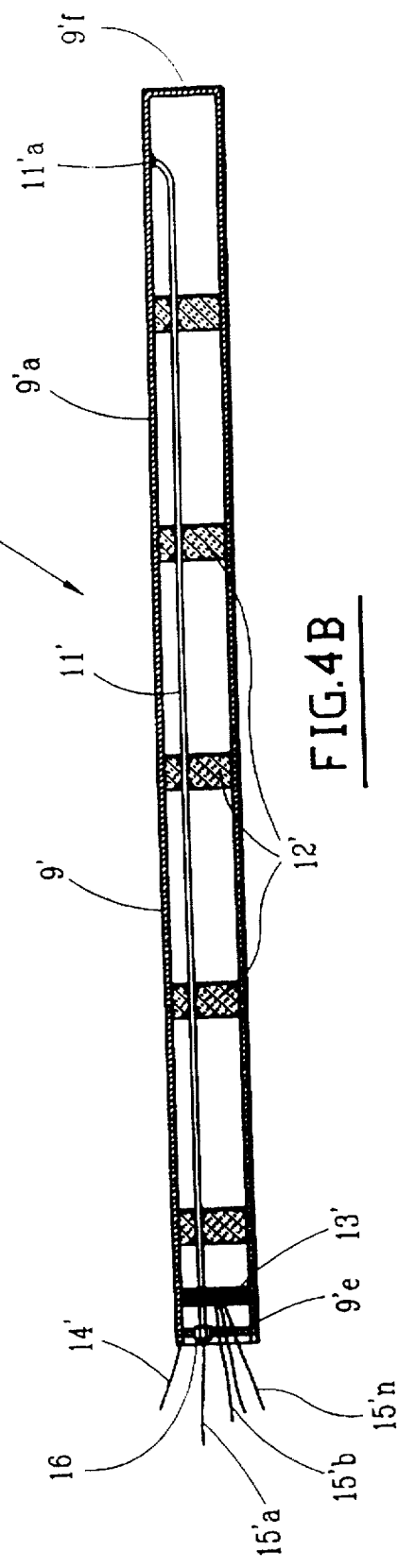

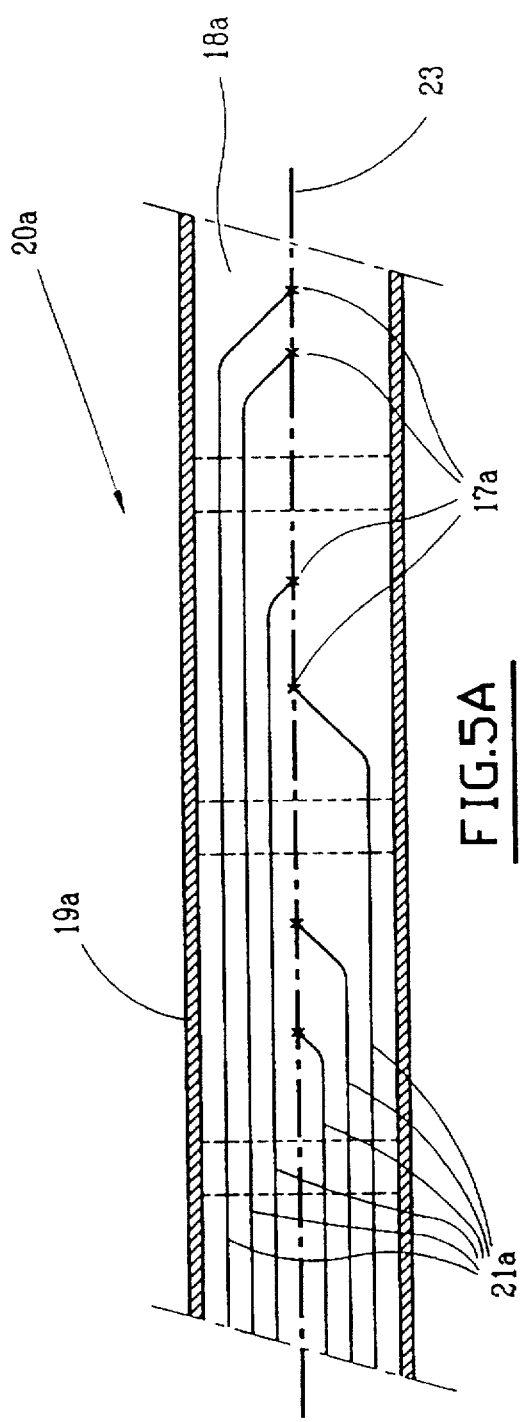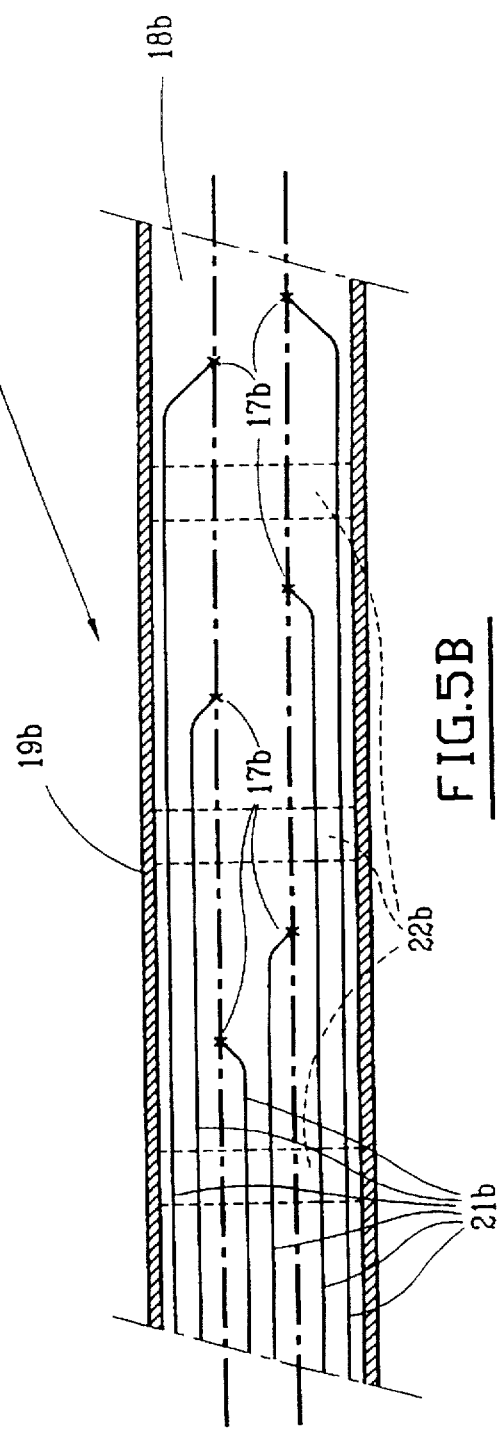

DEVICE FOR DETECTING AND MONITORING PERFORATION OF THE BOTTOM HEAD OF THE VESSEL OF A NUCLEAR REACTOR

FIELD OF THE INVENTION

The invention relates to a device for detecting and monitoring perforation of the bottom head of the vessel of a nuclear reactor, in the event of meltdown of the core of the reactor and of internals arranged inside the vessel of the reactor, due to accidental operation of the nuclear reactor, the detection device including at least one thermocouple. In particular, the device according to the invention can be used for detecting perforation of the bottom head of the vessel of a nuclear reactor cooled by pressurized water.

BACKGROUND OF THE INVENTION

Pressurized water nuclear reactors include a vessel of generally cylindrical shape, containing the core of the nuclear reactor and arranged with its axis vertical in a cylindrical reactor pit having a bottom end located in line with the vessel. The core of the nuclear reactor is cooled by pressurized water which circulates in the primary circuit of the reactor and inside the vessel, in contact with the fuel assemblies.

In the event of certain accidents occurring in the reactor and leading to loss of operation of the core cooling, consideration must be given, in view of the very serious consequences which would result therefrom, even though the probability of such an event is extremely limited to the case in which the safety injections of the reactor might fall to operate. An accident sequence may then occur which leads to meltdown of the core and of the internals of the reactor in the absence of cooling water, which can cause destruction of the bottom head of the vessel by perforation, and flow of the core mass and of the materials surrounding the core into the concrete pit containing the vessel of the reactor.

Contact of the molten fuel mass and of the materials surrounding the fuel, called corium, the temperature of which may reach values of the order of 2500° C., in the absence of cooling, may cause complete destruction of the bottom of the reactor pit.

During normal operation of the reactor, without an accident, the ambient conditions in the reactor pit are very severe. In fact, permanent irradiation takes place, which increases over time during the life of the reactor. The cumulative dose over the predicted 40 year life of a reactor may reach 280 Mrad.

It is important, in the scenario of the coolant loss accident mentioned above, to monitor, in particular, the development of the condition of the vessel bottom head, in order to determine whether the latter is partially or completely melted, and whether the corium is flowing through the vessel at only a few points or over the entire surface of the bottom head.

The ambient conditions in the reactor pit, in the event of perforation of the vessel, make it difficult to place TV cameras in the pit in order to display the development of the phenomenon on a screen. In fact, the vapors of the molten materials, added to the cooling water vapor, will cause blinding of the monitoring device.

In order to monitor the condition of the bottom head of the vessel, the temperature distribution on the bottom of the reactor pit arranged in line with the bottom head of the vessel is determined. The results can be displayed so as to make a thermal map of the bottom of the reactor pit. In fact, the molten corium, consisting of the molten internals and core which flows from the vessel, spreads over the bottom of the reactor pit and causes an increase in the temperature on the bottom, in particular in line with the perforated region of the bottom head of the vessel.

Patent Application FR-A-95-04342, filed in the name of FRAMATOME, describes a method and a device making it possible to detect perforation of the vessel of a nuclear reactor by continuously measuring the temperature at a plurality of points distributed over the surface of the bottom of the reactor pit. In particular, the temperature measurements can be taken by using optical means and, in particular, a plurality of optical fibers arranged on the bottom of the reactor pit, in line with the bottom head of the vessel. Such an optical device has the drawback that the optical fibers are degraded under irradiation in the bottom of the reactor pit. It is therefore necessary to provide a system for monitoring the condition of the fibers, in order to determine whether these can fulfill their function sufficiently. Depending on the results of the fiber monitoring and testing, it may be necessary to replace them during the life of the nuclear reactor.

There are also known temperature measurement devices which consist of conventional thermocouples and means for analyzing the electrical measurement signals delivered by the thermocouples. Conventional thermocouples consist of two wires, of different types, separated by insulating beads and connected together at one of their ends, generally by welding, to form the hot junction of the thermocouple, which is placed as close as possible to the point whose temperature is to be ascertained.

The second end of the wires of the thermocouple is connected to measuring means which make it possible to determine the temperature at the hot junction on the basis of an electromotive force produced by the thermoelectric effect. The two wires of the thermocouple are insulated from one another by insulation beads made of a refractory material, these beads being threaded in sequence on to the wires of the thermocouple. The entire thermocouple is protected by a sheath. For measuring a temperature below approximately 1000° C., use is made of magnesium oxide or alumina insulation beads. For higher temperatures, use is made of hafnium oxide or beryllium oxide insulators.

The use of conventional thermocouples presents drawbacks for measuring temperatures in the bottom of the reactor pit of a nuclear reactor, when the bottom head of the vessel is perforated and molten corium escapes, these temperatures being very high in regions of the bottom of the reactor pit which may extend over several meters. In particular, the properties of known insulators do not suffice for the thermocouples to remain sufficiently insulated in proximity to the heat source over their entire length and to be capable of delivering reliable temperature measurements for a sufficiently long period of time after meltdown of the core of the nuclear reactor. In this case, the beads lose their insulating property and the measurements given by the thermocouples are therefore incorrect. In fact, it is important to obtain indications regarding the temperature changes in the bottom of the reactor pit for as long as possible, in order to monitor the development of the perforation of the bottom head of the vessel, after meltdown of the core.

Finally, it is necessary to use a large number of thermocouples and very complex measurement analysis means for measuring the temperatures at a plurality of points on the bottom of the reactor pit, in line with the vessel bottom head.

SUMMARY OF THE INVENTION

The object of the invention is to provide a device, including at least one thermocouple, for detecting and monitoring the perforation of the bottom head of the vessel of a nuclear reactor, in the event of meltdown of the core of the reactor and of internals arranged inside the vessel which has a generally cylindrical shape and which is placed with its axis vertical, in a part of the building of the nuclear reactor, the detection device including at least one thermocouple aligned with the bottom head of the vessel and having a first branch made of a first metallic material and at least one second branch which is made of a second metallic material, different from the first material, and is welded to a point on the first branch. The device makes it possible to detect and monitor perforation of the bottom head of the vessel for a sufficiently long time after the start of meltdown of the core of the nuclear reactor, in reliable fashion and by employing relatively simple measuring means, even if temperature measurements are taken of a large number of points on the bottom of the reactor pit of the nuclear reactor.

To this end, the first branch of the thermocouple has the form of an elongate hollow section.

Preferably, a plurality of second branches of the thermocouple are housed inside the hollow section and are welded on to an internal surface of the hollow section which thus constitutes the casing of the thermocouple.

BRIEF DESCRIPTION OF THE DRAWINGS

In order that the invention may be more clearly understood, a description will now be given, by way of example and with reference to the appended drawings, of several embodiments of a device for detecting and monitoring perforation of the bottom head of the vessel of a nuclear reactor, according to the invention.

FIG. 2 is a view in section of a part of the bottom of the reactor pit of a pressurized water nuclear reactor, in which the thermocouples of a detection and monitoring device according to the invention are placed.

FIGS. 3A and 3B are perspective views of first and second embodiments of the first branch of a thermocouple of a device according to the invention.

FIG. 4A is a view in longitudinal section of a first embodiment of a thermocouple of a device according to the invention.

FIG. 4B is a view in longitudinal section of a second embodiment of a thermocouple of a device according to the invention.

FIG. 5A is a partial view in longitudinal section of a first alternative embodiment of an internal part of a thermocouple of a device according to the invention.

FIG. 5B is a view in longitudinal section of a second alternative embodiment of an internal part of a thermocouple of a device according to the invention.

DESCRIPTION OF PREFERRED EMBODIMENT

Figure 1:
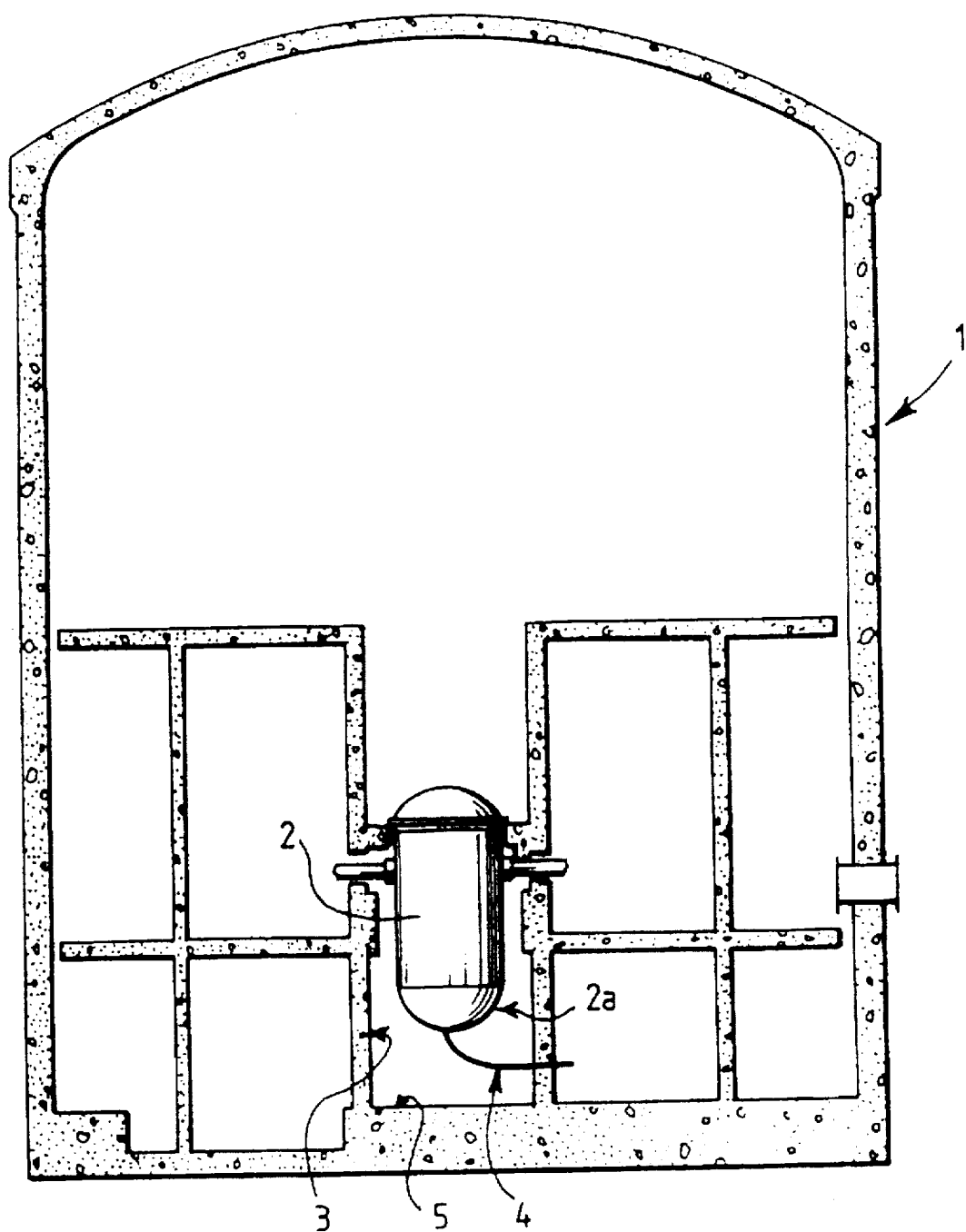
FIG. 1 is a schematic view in vertical section of the building of a nuclear reactor cooled by pressurized water.

FIG. 1 shows the building 1 of a pressurized water nuclear reactor. The building 1 consists of a large concrete structure inside which a pit 3 with vertical axis is formed. The nuclear reactor vessel 2, of generally cylindrical shape and containing the reactor core consisting of fuel assemblies, is arranged in this pit, with its axis aligned with the vertical axis of the reactor pit. The reactor pit 3 has a flat lower end 5 which lies below and in line with the domed bottom head 2a of the vessel 2.

A plurality of instrumentation guide tubes 4 pass through the domed bottom head 2a of the vessel. In the case of a nuclear reactor with electrical power of 1000 MW, fifty sleeves, each connected to one instrumentation tube, pass through the bottom head 2a of the vessel of the nuclear reactor. Each instrumentation tube makes it possible to connect the vessel bottom head penetration sleeve to a measurement room located laterally with respect to the reactor pit in the building of the reactor. The core instrumentation assembly makes it possible to measure the neutron flux and the temperature inside the core, during operation of the reactor. The penetration sleeves of the instrumentation tubes are distributed over the entire surface of the bottom head 2a of the vessel.

In the event of total loss of operation of the core cooling, due to malfunction of the main cooling system and the auxiliary cooling systems of the core, such an accident having a very low probability, the fuel constituting the core of the nuclear reactor and the internals may melt, the molten mass which would then be formed being called corium. The corium which flows into the bottom head of the vessel of the nuclear reactor may cause partial and/or total melting of the bottom head of the vessel.

The molten corium can flow through an opening formed in the bottom head of the vessel and spread over the bottom of the reactor pit.

The operators assigned to the operation of the power station do not then have visible indications of the change in the distribution of the corium the bottom of the reactor pit, because the ambient atmosphere in the reactor pit during the accident prevents any visual inspection by an operator. The temperature at the bottom of the reactor pit increases by approximately 100° to 1200° or more, and the pressure rises from a value close to atmospheric pressure to a value of the order of 5 bar.

In order to monitor the development of the phenomenon of vessel perforation and flow of corium over the bottom of the reactor pit, use is made of a detection and monitoring device according to the invention, including a network of thermocouples placed on or in the bottom of the reactor pit 5.

FIG. 2 shows a part of the bottom of the reactor pit 5, on which thermocouples of a detection and monitoring device according to the invention have been arranged, inside a floor 7 fitted on the concrete slab 6 of the reactor pit bottom 5.

The extra floor 7 consists of refractory brickwork elements which can withstand the high temperatures of the corium flowing over the bottom of the vessel pit 5, in the event of vessel bottom head perforation. The brickwork elements are preferably made of materials similar to those used for lining metallurgy surfaces. The brickwork elements are assembled so as to form channels 8 for routing thermocouples of a detection and monitoring device according to the invention, and are connected to one another a conventional manner, for example by using a refractory concrete.

In the case of the reactor pit bottom represented in FIG. 2, the channels 8 intended to hold thermocouples are of rectangular cross-section and are parallel to one another. These channels 8 may extend, for example in a direction parallel to a diameter of the reactor pit bottom, over the entire region of the reactor pit bottom located in line with the bottom head of the vessel.

FIG. 2 represents only three channels 8, arranged side by side on the bottom of the reactor pit and each containing a thermocouple 10 of a detection and monitoring device according to the invention, but a larger number of channels 8 may, of course, be provided so as to cover the entire region of the reactor pit bottom located in line with the bottom head of the vessel.

Each of the thermocouples 10 includes a first branch 9 in the form of a hollow section of U-shaped rectangular cross-section and open at its lower end, and three second branches 11, in the form of substantially parallel rigid wires arranged in the longitudinal direction of the first branch 9. The first branch 9 of the thermocouple 10 is housed inside a channel 8 in the extra floor 7 of the reactor pit bottom, so that its external surface exactly matches the internal surface of the channel 8 rectangular cross-section.

The open face of the first branch 9 of the thermocouple 10 is oriented towards the slab 6 of the reactor pit bottom.

Although only three second branches 11 have been represented for each of the thermocouples 10, each of these thermocouples may include a larger number of second branches, or optionally only one or two second branches in the form of rigid wires.

The first branch 9 of the thermocouples 10 constitutes a casing, inside which the second branches 11 are arranged. The first branch 9 and the second branches 11 of the thermocouples 10 are made of a different material. For example, the first branch 9 may be made of tungsten and the second branches 11 of a tungsten-rhenium alloy.

FIG. 3A represents the first branch 9 of a thermocouple 10, similar to the thermocouple represented in FIG. 2. The first branch 9 has a base 9a, two side faces 9b and 9c perpendicular to the base 9a, and an open face.

FIG. 3B represents a second embodiment of a first branch 9' of a thermocouple of a detection device according to the invention. The first branch 9' of the thermocouple according to the second embodiment is in the form of a parallelepipedal case of rectangular cross-section, having a top 9'a, a base 9'd and two side faces 9'b, 9'c, which are perpendicular in pairs.

It will be seen below that thermocouples which include a first branch in the form of a closed casing 9' are preferable if it is desired to isolate the second branches of the thermocouple completely from the environment, for example in order to prevent contact between the second branches and the water or the water vapor in the bottom of the reactor pit.

FIG. 4A shows a thermocouple 10 of a detection device according to the invention, including a first branch 9 having the form of a rectangular U-shaped section, as represented in FIG. 3A, inside which blocks 12 of refractory material are fixed, making it possible to support the second branches 11 of the thermocouple 10. The blocks 12 are made of a material which withstands very high temperatures, such as, for example, a ceramic based on aluminum oxide, hafnium oxide or beryllium oxide, which makes it possible to support and insulate the second branches 11 of the thermocouple 10 over its entire path along the length of the first branch 9 of the thermocouple 10. Each of the blocks 12 is pierced by a plurality of openings 12a which are aligned, for example, in a transverse direction perpendicular to the longitudinal direction of the first branch 9. The shape of the openings 12a is so designed that the contact surface area between the insulating blocks 12 and the second branches 11 is as small as possible, in order to limit the leakage currents when the ambient temperature is high. The openings 12a in the successive blocks 12, which are arranged substantially equidistantly over the length of the first branch 9, may alternatively be aligned in a longitudinal direction, as represented in FIG. 4A, in order to support and guide the second branches 11 of the thermocouple in the form of rigid wires, for example of circular cross-section. The cross-section of the wires is designed so as to reduce the number of blocks 12 to a minimum.

Each of the second branches 11 of the thermocouple 10 includes an end 11a which is welded on to the internal surface of the top 9a of the first branch 9, in order to form a hot junction of the thermocouple, and a second end 11b is connected to a connection device or terminal unit 13 which may, for example, be fixed into the brickwork of the extra floor of the reactor pit bottom, in longitudinal extension of the first branch 9 of the thermocouple 10, or fixed to a longitudinal end of the first branch 9.

The terminal unit 13 makes it possible to connect the branches of the thermocouple to the compensation wires which connect the branches of the thermocouple to the means for analyzing the measurements delivered by the thermocouple.

A first compensation wire 14 is electrically connected, via the terminal unit 13, to the first branch 9 of the thermocouple.

A plurality of compensation wires 15a, 15b, ..., 15n are each connected, via the terminal unit 13, to a second branch 11 of the thermocouple 10.

Each of the compensation wires may be produced in the form of a coaxial cable with inorganic insulator.

FIG. 4B represents a thermocouple 10' according to the second embodiment, including a tungsten first branch 9', in the form of a parallelepipedal casing as represented in FIG. 3B and closed at its ends by two plane closure faces 9'e and 9'f. The first branch 9' of the thermocouple 10' is thus in the form of a box which is fully closed in water-tight and vapor-tight fashion, so that the second branches 11' and the hot junctions 11'a of the second branches 11' of the thermocouple 10, on the internal surface of the top 9'a of the first branch 9', are fully isolated from the external atmosphere and, in particular, protected from contact with water or water vapor in the bottom of the reactor pit in which the thermocouple 10' is located.

The second branches 11' of the thermocouple 10' are retained over the length of the first branch 9' by blocks 12' of insulating refractory material which are fixed inside the box constituting the first branch 9' of the thermocouple 10' and are distributed over the length of the first branch 9'. The connection device or terminal unit 13' is fixed inside the first branch 9'.

Each of the second branches 11' of the thermocouple 10' is connected at the terminal unit 13' to a compensation unit consisting of a coaxial cable 15'a, 15'b, ..., 15'n. The first branch 9' of the thermocouple 10' is also connected to a compensation wire 14'.

Each of the compensation wires 15'a, 15'b, ..., 15'n connected to a second branch 11' of the thermocouple 10' at the terminal unit 13' passes in leaktight fashion through the closure end 9'e of the first branch 9', via a cable gland 16 or other equivalent leaktight penetration device.

The thermocouple 10' may be used in a humid atmosphere without disturbing the measurements taken by the thermocouple at each of its hot junctions such as 11'a.

FIGS. 5A and 5B show two alternative embodiments, 20a and 20b respectively, of a thermocouple of a detection and monitoring device according to the invention.

The thermocouple 20a includes a first branch 19a which may, for example, consist of a tungsten section as represented in FIG. 3A, or a box as represented in FIG. 3B.

A plurality of second branches 21a are arranged over the length of the first branch 19a and are each welded at their ends to the internal surface of the top 18a of the first branch 19a of the thermocouple, in order to form hot junctions 17a aligned along the median axis 23 of the top 18a of the first branch 19a.

It is thus possible to measure the temperature of the bottom of the reactor pit of a nuclear reactor, on which the thermocouple 20a is fixed, at a plurality of points aligned in a straight direction along the reactor pit bottom.

FIG. 5B represents a thermocouple 20b, the first branch 19b of which may be similar to the thermocouple branch 19a, and the second branches 21b of which, consisting of wires made of an alloy such as tungsten-rhenium, are retained in parallel arrangements by refractory insulating blocks 22b spaced along the longitudinal direction of the first branch 19b.

The second branches 21b of the thermocouple 20b are welded to the internal surface of the top 18b of the first branch 19b of the thermocouple, at points 17b constituting the hot junctions of each of the elementary thermocouples consisting of the first branch 19b and a second branch 21b.

The hot junctions 17b are distributed in a plurality of parallel longitudinal directions of the top 18b of the first branch 19b. The hot junctions 17b are arranged in a zig-zag configuration with respect to the median axis of the thermocouple, so that the thermocouple 20b can determine the temperature at different points on the bottom of the reactor pit of the nuclear reactor, which are distributed over the length and over the width of the section constituting the first branch 19b.

It is, of course, possible to distribute the hot junction points of the thermocouples of the device according to the invention differently than represented in FIGS. 5A and 5B, depending on the size and shape of the hollow section elements constituting the first branches of the thermocouples.

If the first branch of the thermocouple is in the form of a box, as represented for example in FIG. 4B, the box is filled with a dry gas, for example, air, or a neutral gas which provides perfect insulation between the wires constituting the second branches of the thermocouples and between the wires and the walls of the box. Contact of the wires and hot junctions with a humid atmosphere is also prevented.

Figure 6:
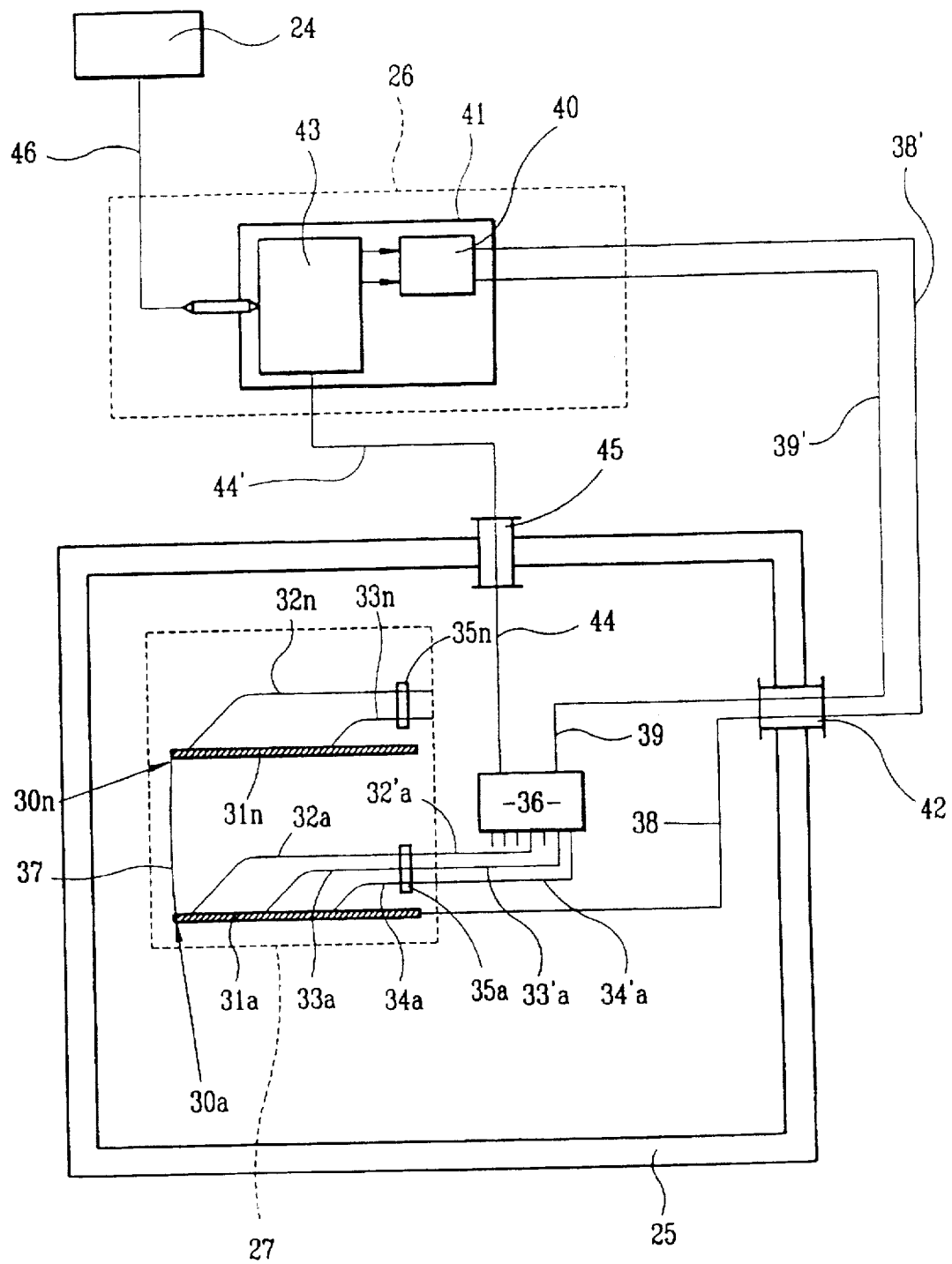
FIG. 6 is a schematic view of an entire device for detecting and monitoring perforation of the bottom head of the vessel of a nuclear reactor, according to the invention.

FIG. 6 schematically represents an entire device for detecting and monitoring perforation of the bottom head of a vessel of a nuclear reactor, according to the invention.

The device includes a part arranged inside the safety building 25 of the nuclear reactor and a part located outside the safety building 25, in a measurement acquisition region 26 close to or inside the control room of the reactor.

The device according to the invention furthermore includes a control and display station 24 arranged inside the control room of the nuclear reactor.

Inside the safety building 25 of the reactor, the device according to the invention includes a reactor pit having a bottom consisting of a slab, the contour 27 of which has been represented in broken lines in FIG. 6.

The horizontal portion of the reactor building 25 and the reactor pit bottom 27 have been represented with a square shape, although the building and the reactor pit bottom generally have a circular shape. The invention is, of course, applicable regardless of the shape of the building of the reactor and of the reactor pit.

Thermocouples 30a, . . . , 30n, which are in a form similar to that represented in FIGS. 4A, 4B, 5A or 5B, have been arranged on the bottom 27 of the reactor pit.

Each of the thermocouples 30a, . . . , 30n includes a first branch 31a, . . . , 31n in the form of a hollow section having, for example, a rectangular cross-section, and a plurality of second branches, such as 32a, 33a, 34a as regards the thermocouple 30a, or 32n, 33n as regards the thermocouple 30n, which each consist of a wire made of a different material from the material constituting the first branch 31a or 31n, respectively.

In order to make the second branches of the thermocouples visible, these have been represented outside the hollow section constituting the first branch, but in reality the second branches of the thermocouples are arranged inside the cavity formed by the first branch of the thermocouple or defined between the first branch and the bottom of the reactor pit.

By way of example, a set of thermocouples 30a, . . . , 30n may be provided, the first branches of which are all parallel and are arranged with a given spacing, so as to cover the major portion of the bottom 27 of the reactor pit. Each of the thermocouples 30a, . . . , 30n further includes a plurality of second branches which are welded inside the first branch, at points spaced apart along the length of the first branch of the thermocouple, to form a set of hot junctions distributed over the entire area of the reactor pit bottom 27. This provides means allowing a complete thermal map to be made of the reactor pit bottom 27.

The set of second branches of a thermocouple, for example the set of second branches of the thermocouple 30a (or the thermocouple 30n), is connected to a terminal unit 35a (in the case of the thermocouple 30a) or 35n (in the case of the thermocouple 30n) via the end of the second branches which is opposite the hot junction.

Each of the second branches of the thermocouples is connected, via the terminal unit of the thermocouple, to a corresponding compensation wire consisting of an insulated coaxial cable.

By way of example, FIG. 6 represents the compensation wires 32'a, 33'a and 34'a connected respectively to the second branches 32a, 33a and 34a of the thermocouple 30a.

Each of the compensation wires, such as 32'a, 33'a, 34'a, is connected to the input of a selector switch 36 arranged inside the safety building 25 of the reactor.

The first branches 31a, . . . , 31n of the thermocouples 30a, . . . , 30n are connected to one another electrically, via a conductor 37 which preferably consists of a wire made of a material identical to the material constituting the first branches 31a, . . . , 31n of the thermocouples 30a, . . . , 30n, for example a tungsten wire.

The first branch of one of the thermocouples, for example the thermocouple 30a, is connected via a first compensation wire 38 and a second compensation and connection wire 38' to a signal processing and measurement module 40 constituting a part of a measurement acquisition unit 41.

The set of first branches of the thermocouples may also be grounded.

The selector switch 36 has a single output which is connected, via compensation and connection wires 39, 39', to the processing and measurement module 40.

The respective compensation and connection wires 38 and 38', and 39 and 39', which consist of identical conductors, are connected to one another at a leaktight penetration piece 42 passing through the wall of the safety containment 25 of the nuclear reactor, making it possible for the various measurement and control conductors to be passed in leaktight fashion through the wall of the safety containment of the reactor, while ensuring perfect isolation of the internal volume of the safety building of the reactor from the external atmosphere.

The signal processing and measurement module 40 is connected, inside the acquisition unit 41, to a control and data transmission module 43 which is connected via conductors 44 and 44' to the selector switch 36 arranged inside the safety building 25 of the nuclear reactor.

The connection conductors 44 and 44' are electrically connected to one another at a leaktight penetration 45 passing through the safety containment 25 of the nuclear reactor.

The control and transmission module 43 is connected by a cable 46 to the control and display station 24 arranged inside the control room of the nuclear reactor.

The set of compensation wires connected to the second branches of a thermocouple, such as 30a or 30n, passes through a conduit which protects the compensation wires between the terminal unit and the selector switch. This prevents destruction and premature cutting of the connections between the thermocouples and the selector switch 36 which is arranged in the safety building of the reactor, if corium falls on to the pit bottom 27 of the nuclear reactor.

Via conductors 44' and 44, the control module 43 controls the selector switch 36 in such a way that the measurement signals of each of the thermocouples 30a, ..., 30n, taken at each of the second branches of the thermocouple, are successively sent to the output of the selector switch 36 connected to the signal processing and measurement unit 40, via conductors 39 and 39'. Sequential control of the selector switch makes it possible to locate the origin of each of the measurement signals and therefore to determine the temperature distribution on the bottom 27 of the reactor pit.

The measurement results transmitted by the processing and measurement module 40 to the control and transmission module 43 are sent to the control and display station 24 inside the control room of the nuclear reactor. The temperature measurement results can be displayed on a screen, in the form of an image of the pit bottom of the nuclear reactor, containing the values of the temperatures at various measurement points distributed over the bottom of the reactor pit.

The device according to the invention allows very rapid and reliable determination of the temperatures at a plurality of points on the bottom of the reactor pit. In the event of core meltdown and perforation of the vessel by corium, the corium flows on to the pit bottom, and causes a very rapid rise in temperature in the region where the corium has escaped. It is thus possible to detect perforation of the vessel and to determine the region of the bottom head of the vessel, located in line with the bottom of the reactor pit, in which the perforation has taken place.

These results are obtained with a simple and robust device which can operate for some time after perforation of the vessel, because the second branches of the thermocouples are protected by the first branch in the form of a hollow section or box. Furthermore, even if a thermocouple is partially destroyed when the corium escapes, it can continue to deliver some temperature measurements because it includes a plurality of second branches, providing a plurality of hot junctions which each take a temperature measurement.

Furthermore, the device can operate perfectly in a humid atmosphere, if use is made of a first thermocouple branch consisting of a leaktight box.

Use may be made of thermocouples in which the first branch has a section shape other than the shapes which have been described.

The cross-section of the elongate hollow section constituting the first branch of the thermocouple may have any polygonal shape, not only a rectangular shape or square. The hollow section may be open over its entire length on one of its faces and at its ends, or may be in the form of a completely leaktight box.

The device according to the invention may include thermocouples arranged in any fashion with respect to one another so as to cover the major portion of the bottom of the reactor pit of the nuclear reactor and have, over their length, any shape allowing them to match optimally the shape of the structural part of the nuclear reactor on which they are mounted, in line with the bottom head of the vessel. The various thermocouples may be fixed in any fashion on to the bottom of the reactor pit or on to the structure of the building of the reactor, and be protected from falling corium by any means, such as brickwork or a refractory lining.

The set of first branches of the thermocouples used may be connected together electrically and, for example, grounded.

The measurement analysis means associated with the thermocouples may be arranged, with respect to the building and the control room of the nuclear reactor, in a manner other than that which has been described. For example, the selector switch may be placed outside the building of the reactor, in an electrical equipment room. In this case, the conductor for connecting the control module with the selector switch does not pass through the wall of the safety building of the reactor. In contrast, it is necessary to provide a plurality of penetrations for routing the set of compensation wires which are each connected to a second branch of a thermocouple.

It is also possible to provide a cold junction box on the single output of the selector switch, allowing connection to the processing module of the acquisition unit via an insulated copper wire.

The invention is applicable not only to nuclear reactors cooled by pressurized water, but also other types of nuclear reactor having a vessel whose bottom head may be perforated in the event of core meltdown.

I claim:

1. Device for detecting and monitoring penetration of the bottom head of a vessel of a nuclear reactor, in the event of meltdown of a core of the reactor contained in the vessel and of internals arranged inside the vessel which has a cylindrical shape and which is placed with its axis vertical, in a reactor pit of a safety building of the nuclear reactor, the detection device including at least one thermocouple which rests on a slab constituting a bottom of the reactor pit, which is aligned with a bottom head of the vessel and which has a first branch made of a first metallic material and at least one second branch which is made of a second metallic material, different from the first material, and is welded to a point on the first branch, the first branch of the thermocouple having the form of an elongate hollow section.

2. Device according to claim 1, wherein said thermocouple is covered with a refractory protective layer.

3. Device according to claim 1, wherein the at least one second branch of the thermocouple is arranged inside the elongate hollow section constituting the first branch and is welded at one of its ends to an internal surface of the elongate hollow section in order to constitute a hot junction of the thermocouple.

4. Device according to claim 3, wherein the at least one second branch of the thermocouple is retained inside the elongate hollow section constituting the first branch of the thermocouple by blocks of insulating refractory ceramics.

5. Device according to claim 1, wherein the elongate hollow section constituting the first branch of the thermocouple has one open face and a U-shaped rectangular cross-section.

6. Device according to claim 1, wherein the first branch of the thermocouple has the form of a parallelepipedal box of rectangular cross-section.

7. Device according to claim 6, wherein the box constituting the first branch of the thermocouple is closed in leaktight fashion at its ends by walls.

8. Device according to claim 1, wherein the thermocouple includes a plurality of second branches, each welded at a point constituting a hot junction to the first branch, the hot junctions being distributed over the length of the first branch of the thermocouple.

9. Device according to claim 8, wherein the hot junctions are aligned on a single line of longitudinal direction of the first branch of the thermocouple.

10. Device according to claim 8, wherein the hot junctions are aligned on a plurality of a straight lines parallel to the longitudinal direction of the first branch of the thermocouple.

11. Device according to claim 1, including a plurality of thermocouples distributed over the bottom of the reactor pit of the nuclear reactor, inside the safety building of the nuclear reactor, each thermocouple of the plurality of thermocouples including a first branch and a plurality of second branches, said device further comprising:

(a) a selector switch having a plurality of input channels, each connected via a connection device to a second branch of a thermocouple;

(b) a measurement signal processing module connected to an output channel of the selector switch;

(c) a control and transmission module connected to the measurement signal processing module and to the selector switch; and (d) a control and display station connected to the control and transmission module.

12. Device according to claim 11, wherein the first branches of all of the plurality of thermocouples are electrically connected to one another and to the measurement signal processing module.

13. Device according to claim 11, wherein the selector switch is arranged inside the safety building of the nuclear reactor, while the measurement signal processing module and the control and transmission module which constitutes a data acquisition unit as well as the display and control device are arranged outside the safety building of the nuclear reactor, the first branches of the thermocouples of the plurality of thermocouples, and the output channel of the selector switch being electrically connected to the measurement signal processing module by conductors constituting thermocouple compensation wires passing through the wall of the safety building of the nuclear reactor.

14. Device according to claim 13, wherein the control and transmission module is connected to the selector switch to control the selector switch, via conductors passing through the wall of the safety building of the reactor.

15. Device according to claim 11, wherein the display and control station is arranged inside a control room of the nuclear reactor.

* * * * *